United States Patent [19]
Oertle et al.

[11] 4,179,940
[45] Dec. 25, 1979

[54] STRUCTURAL FAILURE DETECTION METHOD

[75] Inventors: Donald H. Oertle; Marvin L. Peterson, both of Ponca City, Okla.

[73] Assignee: Conoco, Inc., Ponca City, Okla.

[21] Appl. No.: 947,809

[22] Filed: Oct. 2, 1978

[51] Int. Cl.² ............................................. G01N 3/32
[52] U.S. Cl. ........................................ 73/808; 73/799
[58] Field of Search ................. 73/808, 809, 810, 811, 73/812, 813, 814, 815, 774, 775, 799

[56] References Cited

U.S. PATENT DOCUMENTS

| | | | |
|---|---|---|---|
| 2,948,872 | 8/1960 | Beckman | 73/774 X |
| 3,343,406 | 9/1967 | Branger | 73/808 |

Primary Examiner—Jerry W. Myracle
Attorney, Agent, or Firm—Cortlan R. Schupbach, Jr.

[57] ABSTRACT

Crack initiation in metallic structural members subject to cyclic loading is predicted by sensing metallurgical changes taking place as a result of the cyclic loading. Fatigue loading produces a cycle comprising a condition described as fatigue relaxation followed by fatigue intensification. By monitoring this cycle, measured strain for a known applied load will increase or decrease. By monitoring the change in strain load, crack initiation can be predicted as fatigue relaxation becomes fatigue intensification. In a preferred embodiment, the strain gauge is mounted beneath a patch excluding ambient atmosphere during monitoring of the structural members.

9 Claims, 4 Drawing Figures

STRUCTURAL FAILURE DETECTION METHOD

This invention relates to a method for predicting crack initiation in metallic structural members. More particularly, this invention relates to a method for predicting the formation of cracks in metallic structural members subject to cyclic stress.

Formation of cracks in structural members subject to stress is a problem of great importance. This is particularly true in metallic structural members of all configurations wherein crack initiation is but the first step leading to total failure of the member. For example, the frame members of aircraft, frame members of ships, and members of steel offshore production and drilling platforms all depend heavily upon metallic structural components. In the constant search for more efficient structures, additional stress is placed on these structural members which pushes the technology of metallic structural members to the limits of the art of metallurgy and engineering designs involved.

Many other examples exist where solid metallic structural members subject to cyclic stress are potential hazards to the operational safety of the structures and the well being of those using them. For example, the rib frames of tankers joined to the hull plates are critical. Metallic members holding helicopter blades, aircraft frames, frame supports, bridge supports, reactor supports, pressure vessels and the like can fail due to fatigue cracking with results catastrophic to the loss of human life and equipment, as well as great loss of productivity.

It is therefore extremely important that any cracks forming in such metallic structural members be detected at the earliest possible point so that appropriate repairs can be made.

Many attempts have been made to detect such cracks, the earliest of these means being visual inspection. A visual inspection can be greatly enhanced by applying a material to the member, removing the material, and then applying a second material which reacts with the first to form a dye so that if the first material oozing from a crack which has been initiated to be apparent to visual inspection, this method being known as the dye-check method. However, this method is often not practical when access is limited such as in the case of members which are sheathed beneath skins, hull plates, or beneath water.

A more sophisticated system is the acoustic emission method, but this method is disadvantageous because equipment is relatively complex and the extent of cracks cannot be determined. In addition, this method does not always predict cracks. Ultrasonic methods have been employed but are highly geometry dependend and likewise do not predict crack initiation.

The method described in U.S. Pat. No. 3,667,862 discloses detecting a crack in the wall of a hollow object by evacuating the interior of the hollow object and detecting loss of vacuum. However, this method is not suitable for predicting cracks or for detection of cracks existant in non-permeable solid structural members. The method also fails to detect a crack until the crack has completely penetrated the member which is being sensed, or to predict crack formation.

U.S. Pat. No. 2,936,612 teaches a quality factor (Q) which decreases prior to failure by rupture upon increase of the amplitude of dynamic strain for structural members. However, this method is likewise not applicable for the reasons set forth above and cannot predict crack initiation.

Other references detect leaks in vessels by forming a sealed cavity over a suspected leak site and then placing a vacuum on the cavity to detect a leak by loss of vacuum, soap bubbles, or tracer gases. Unfortunately, such methods require ideal conditions in order to be operable, and in addition, will not detect or predict small cracks.

In our previously filed patent application Ser. No. 890,559, with an effective filing date of Mar. 17, 1977, we have disclosed a method for the early detection of cracks in non-permeable structural members by placing a fluid-tight enclosed patch over the member, forming a vacuum within the patch, and detecting loss of vacuum when crack initiation begins. Such patches have the advantage of being useful in almost all areas and allow continuous monitoring of structural members without direct human intervention. In one embodiment of the previously filed invention, a strain gauge was enclosed within the patch to check the strain placed upon a particular area. However, this method likewise did not predict crack initiation.

In many instances, such as aircraft frame members, once a crack has initiated catastrophic failure can rapidly follow. It would therefore be of great benefit in many applications to be able to predict when a fatigue crack is likely to initiate in a metallic structural member, allowing repairs before such catastrophic failure can occur.

It is therefore an object of the present invention to go several steps further than the previously described systems and detect potential fatigue crack initiation sites as well as monitor when cracks are actually initiated in the structural members. It is also an object to provide a system which will provide a reliable, simple method of remotely measuring stress, and identifying potential fatigue crack initiation sites while optionally detecting very small cracks which later form. Such a method would clearly be of great benefit in the art.

According to the instant invention, we have discovered a method for predicting fatigue crack initiation in structural metallic members subject to cyclic stress, comprising sensing strain on said metallic structural members, monitoring the strain through fatigue relaxation until fatigue intensification, and predicting crack initiation when fatigue intensification occurs. The basic concept is thus to place a strain gauge or other strain detecting means on cyclic high stress areas of structural members, said strain gauge being connected by leads to a central monitoring station. Careful monitoring and evaluation of the strain gauge data will allow prediction of failure location sites before cracks can be detected by any other known means. Prior to fatigue failure in structural metallic materials, metallurgical changes take place as a result of cyclic loading which can be described as fatigue relaxation and then fatigue intensification. The measured strain in localized areas for a known cyclic load will increase and then decrease with further cycles; as a result, fatigue on the member (high stress areas) can be easily monitored.

Engineering experience with the more common elements of modern society such as bridge supports, aircraft frames, ship frames, offshore production platforms and the sort, is sufficiently sophisticated and experienced to predict areas where with resultant fatigue will occur. However, no previously known method can predict the effect of the strain. In the past, one method of preventing such structural failure has been to "overbuild" the structure by applying several times more strength in the area than ordinary engineering dictates would indicate to be necessary. However, as the cost of materials continues to rise, while the availability of materials continues to fall, it becomes increasingly necessary to devise a method such that overbuilding is not necessary. Such a method is provided by the instant invention.

The term "fatigue" is used to describe the failure of a material under a repeated application of tensile stress (cyclic tensile stress). Stress required to cause failure, if applied a large number of times, is much less than that necessary to break a structural element with a single pull. Such cyclic fatigue is estimated to cause over 80% of the operating failures of machine elements, but in many cases the stress cycles are very complex with occasional high peaks; for example, the gust loading of aircraft wings, or the structural elements of offshore platforms subject to storms and high waves.

Such structural fatigue arises from a complex of engineering, metallurgical and environment factors. Service conditions often involve a load spectrum of different stress ranges. Structural elements subjected to alternating cycles of tensile stress greater than the endurance limit for short period exhibit a lowering of the fatigue life (called overstressing). In structural elements subjected to a large number of cycles of stress slightly under the fatigue limit, the resultant fatigue limit is raised (known as understressing or coaxing). When the amplitude is increased in a series of steps, fatigue life can improve but never make good the damage of overstressing.

Thus in the instant invention, paired stress sensors or strain gauges are used. One strain gauge is placed on an area subject to the highest cyclic stress. Another strain gauge is placed nearby on the structural element, but away from the highest stress area. With the low-stressed strain gauge as a reference, the fatigue relaxation or cold flow due to fatigue stressing of the structural element is carefully monitored. We have discovered that with increasing stress cycle fatigue relaxation will occur, evidenced by increased strain range per unit load, and peak, following which peak strain range per unit load will begin to decrease (fatigue-intensification). When the fatigue intensification has approached or fallen below the initial point of relaxation as indicated by the strain gauge, crack initiation is imminent and a prediction can be made that under the same continued service, cracks will begin to initiate in the near future.

Structural members in use, where said members have an unknown fatigue history, can also be monitored using the instant invention. Strain gauges are applied as described, and the difference in strain range between stress cycles is monitored as the strain range per unit load begins to decrease more and more rapidly (fatigue-intensification) crack initiations can be predicted. More accurate predictions will become possible as experience is gained with various alloys, thicknesses, stress service and so forth. However, application to new structural members, while preferred, is not a limitation upon the instant invention.

The endurance of steel to cyclic stress can be somewhat improved by various metallurgical techniques which are known to those skilled in the art. Such techniques are described, for example, in *Metallurgy for Engineers*, by Rollason, 4th edition, 1973, pages 28 and 29, Fletcher and Son Ltd., Great Britain.

In most metallurgical structural elements trouble or "worry" areas are joint areas, whether joined by riveting, overlapping metal plates, or welding. This is particularly true where weld areas such as T joints or K joints are used in the structure. In welded joints particularly, crack initiation is known to occur most frequently in the heat affected zone (HAZ) immediately surrounding the weld, where the metal is normally harder and stronger but less tough than the original metal throughout the remainder of the member. When welded structural members are monitored, a monitoring device should be placed on the heat affected zone near the weld itself, and a control monitor outside the heat affected zone. In the preferred embodiment of the instant invention, an environmental patch would be placed so as to cover both gauges and exclude them from fluid communication with ambient environment and allow the gauges to be in fluid communication one with the other, then sealing a fluid passageway in fluid communication from the patch to a source of pressure different than ambient pressure at the structural member, then imparting a higher or lower pressure than ambient to the cavity in the fluid passageway and monitoring the internal pressure as well as the strain gauge reading to determine incipient crack formation and the actual formation of the crack itself when the integrity of the enclosed space is ruptured and ambient atmosphere is allowed to intermingle with the atmosphere within the patch. This method is preferred since outside influences which can affect readings of strain gauges and other stress sensors such as moisture, can be easily excluded. In addition, since strain gauges are metallic in nature, mildly corrosive atmospheric conditions can likewise be excluded. In addition, double monitoring is provided, since any crack which suddenly forms is detected by the change of pressure within the patch.

Strain hardening is caused by cold working of metallic elements and relative mobility. This phenomena is most graphically illustrated in application of tensile stress to freshly welded structures. There is an abrupt drop in strain per unit load when freshly welded joints are subjected to stress, said strain coming quickly to equilibrium after a few cycles of stress application. Thereafter the fatigue relaxation/fatigue intensification lifetime is followed. Fatigue intensification begins when the metal begins to harden (through cold flow) and no further stress accommodation by the metal itself occurs. Each cycle to which the structure is thereafter subjected successively lowers the capacity of the structure to withstand stress without crack formation.

Stress in structural members can be determined by any means well known to those skilled in the art, although most preferred is use of a strain gauge in order to determine the stress cycle used to predict crack initiation. Strain gauges used can be of any type, such as those produced by Micro Measurements, Romulus, Mich., USA. The use of a control strain gauge is preferred since all metals are subject to fatigue damage when strained cyclicly at sufficient amplitudes and the strain gauges are no exception. Fatigue damage in a strain gauge is first evidenced as a permanent change in the unstrained resistance of the gauge. This resistance change is ordinarily expressed in terms of the equivalent indicated strain and is referred to as "zero-shift". The strain gauge is considered to "fail" in fatigue over a wide range of actual damage levels depending upon the application for which the gauge is used and the accuracy requirements which must be met. However, the use of a control strain gauge outside the high stress or high cyclic stress areas will enable calibration of the gauge subjected to cyclic stress and allow a more accurate reading and prediction of crack initiation. In addition, gauges are calibrated prior to each reading and thus "drift" is not significant.

The invention is more concretely described with reference to the drawings below.

DETAILED DESCRIPTION OF THE DRAWINGS

Figure 1:
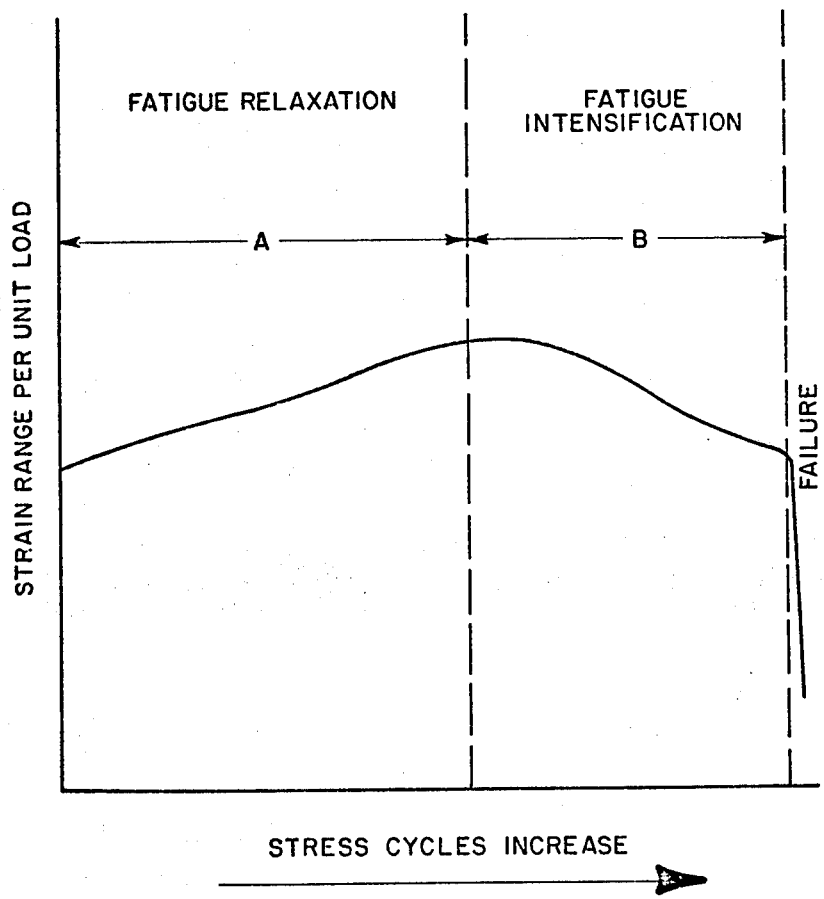
FIG. 1 is a graph illustrating the cycle of fatigue relaxation and fatigue intensification prior to crack initiation.

FIG. 1 illustrates the normal cycle of fatigue relaxation and fatigue intensification undergone by metallic elements subject to cyclic stress. Section A of the graph is fatigue relaxation caused by cold flow of the metal as the cyclic load is alternately applied and released. Fatigue intensification in section B of the graph begins to become evident after the metallic structure has fatigued past the point where further cold flow produces high localized stress. At this point fatigue intensification becomes apparent and a decrease in the strain range per unit load becomes evident (decrease in the structure's ability to withstand a given stress with each succeeding cycle). Crack initiation can be predicted after a small decrease in strain range from the peak obtained from fatigue relaxation. Different metals and alloys undergo fatigue relaxation at different rates, and crack initiation tends to vary dependent upon several factors such as high load, low load, thickness of metal, and so forth. However, crack initiation is imminent once the fatigue intensification curve shows a drop in strain range which approximates that of the member prior to the fatigue relaxation caused by cyclic loading. As the rate of change for fatigue intensification increases with each stress cycle, crack initiation is imminent.

Figure 2:
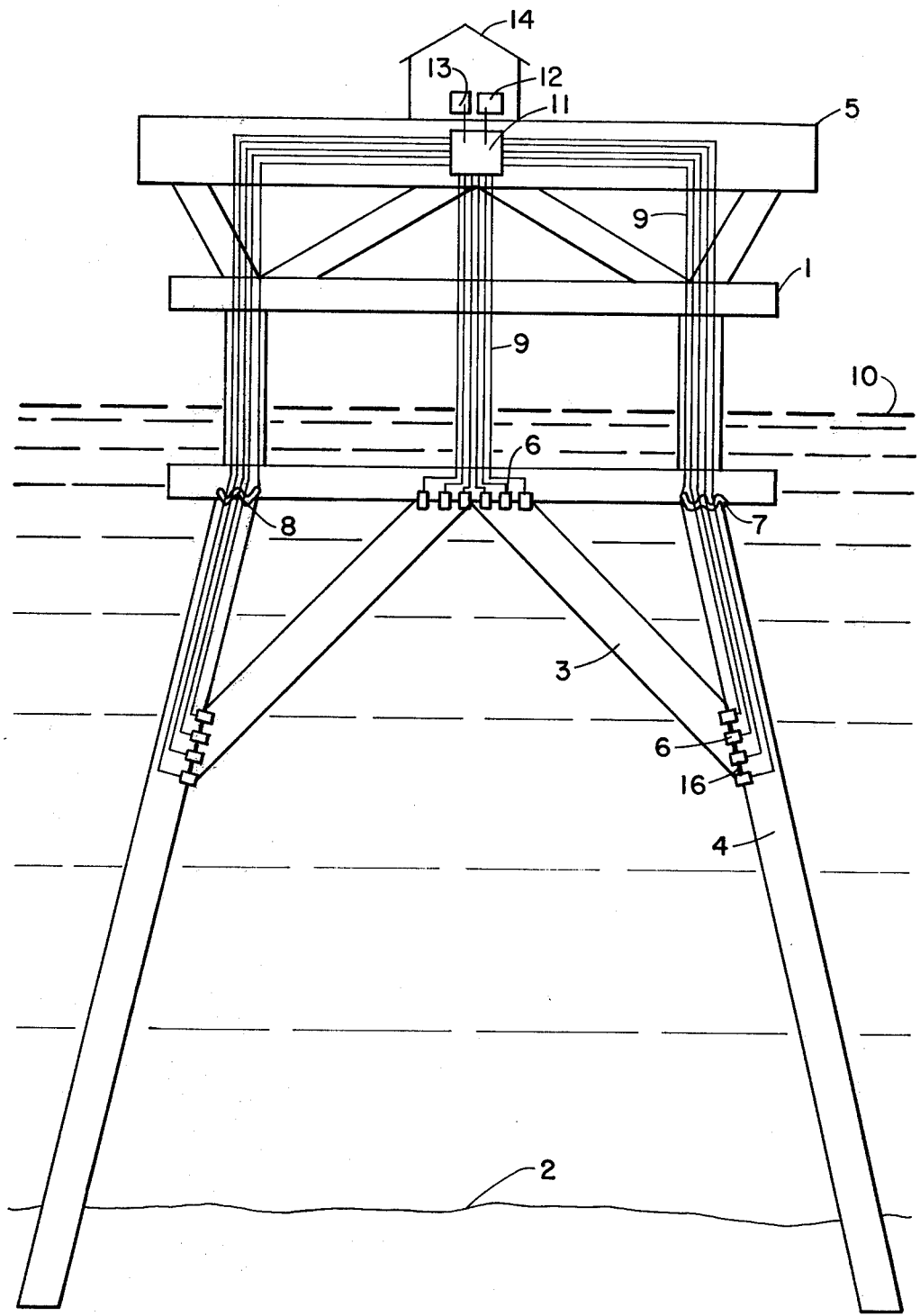
FIG. 2 is a schematic cross section of an offshore platform having installed thereon the apparatus and method of the instant invention for monitoring crack initiation in cyclicly stressed structural members.

FIG. 2 illustrates a cross section of an offshore platform having the apparatus of the instant invention installed thereon.

The platform (1) rests upon and is affixed to the sea floor (2) with its major portion submerged below water level (10). The platform is comprised of various members including deck members (5) bracing members (3) and leg members (4). The members are joined together to form the platform by numerous welds (16) as in the joint between members 3 and 4. Environmental patches (6) of the preferred embodiment of the instant invention are connected by fluid tight lines (9) to a central station and controller (11) and also in fluid communication with a pressure source different than ambient (12). Elongated patches (7) and (8) are employed to monitor large welds having a heat affected zone and strain gauges placed on said welds and on the non-heat affected portions of the structural member, all such strain gauges being connected together under the same patch excluding ambient environment. Such patches are employed to monitor the weld joints joining critical members which are stressed by wave actions. Pressure differential equipment and signal conditioners (11) are connected to monitor readouts (13), which combination has the capacity of monitoring the strain gauges and/or patches in providing an alarm of leakage beneath any patch by loss of differential pressure in the line associated therewith. The equipment also has the capability of allowing readouts on various welds such that fatigue intensification which occurs after fatigue relaxation can be monitored and the area can be closely watched for crack initiation. These components are contained in shelter 14 on the platform.

Figure 3:
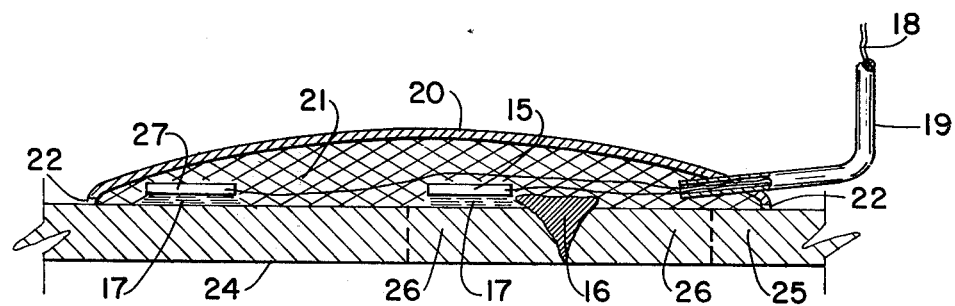
FIG. 3 is a cross sectional of an embodiment wherein provision is made to exclude outside environment from the strain gauge and the strain gauge is mounted within a patch.

FIG. 3 shows a preferred embodiment of the instant invention in vertical sectional view. A strain gauge (15) is adhered to the member within the vicinity of weld (16) by means of adhesive (17). The strain gauge is connected to a readout (not shown) by insulated conductors (18) situated within a fluid tight line (19) which places pressure different than ambient under an environment patch (20) which comprises a permeable material (21) forming a continuous fluid permeable cavity sealed from the environment by the impermeable layer of sealant which can also be used to form the patch itself (22). The joined frame members (24) and (25) which are connected by weld (16) each contain a heat affected zone (26) extending a short distance either side of the weld. A control strain gauge (27) is adhered by adhesive (17) to a frame member outside the area affected by heat affected zone and is likewise connected to insulated conductors (18) to a readout not shown.

Figure 4:
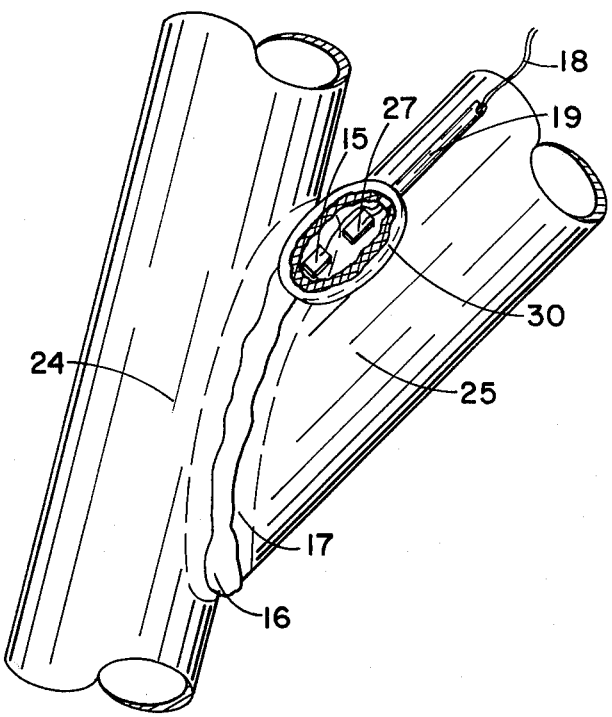
FIG. 4 is an embodiment of the instant invention wherein a strain gauge is mounted on a cyclicly stressed structural member and a control strain gauge is mounted outside the heat affected zone of the structural member.

FIG. 4 is a three-dimensional view of the preferred embodiment set forth in FIG. 3 wherein the entire path (30) is situated over a weld area (16) having a heat affected zone (17) when joining two structural members (24) and (25). The patch is cut away to show the strain gauges (15) and (27) and the fluid tight conduit (19) containing insulating conductors (18).

According to our invention, strain gauges are provided at cyclic stress concentration areas of metallic structural members such that fatigue relaxation and intensification can be monitored and crack initiation can be predicted. In a preferred embodiment, a pair of strain gauges are provided, one monitoring the high stress area itself, and a second in a low or normal stress area of the structural member to provide a benchmark or reference as to changes in the stress-strain ratio in the high stress area (area undergoing higher stress). Although one reference gauge could be used to benchmark many strain gauges, it is preferred to use the gauges in pairs, maintaining the linear distance between said gauges as close as possible while staying outside the high stress area with the reference gauge.

Strain gauges useful in the practice of the instant invention are those well known in the art. Such gauges can range in size (gauge length) from microdots (0.2 millimeters) to over 6 inches in length and the particular gauge will, of course, be chosen for the application necessary. In a preferred embodiment the gauges would be within a patch on the structural member, said patch capable of excluding ambient environment and allowing the strain gauges to be in fluid communication one with another. The monitoring wires from the strain gauges are then situated within the sealed fluid tight passageway connecting the patch with a device to monitor changes in pressure between that in the patch and ambient. In a most preferred embodiment, the pressure imparted to the cavity is a very low pressure (or vacuum). The low pressure employed can be in the millitor range for most applications. Devices to measure these low pressures are very sensitive, reliable, and relatively inexpensive. The atmosphere within the patch can be monitored by a differential pressure transducer such as described in U.S. Pat. No. 3,505,634 or a thermocouple gauge such that if ambient atmosphere enters the patch due to rupture of the patch or crack propagation, the transducer provides an electrical signal indicating the pressure difference. The signal can be connected so as to trigger an alarm such as a light, bell, horn or the like. Various patches can also be arranged such that strain gauge readings and/or pressure differential readings can be immediately isolated upon sensing a difference in readings.

Strain gauges are normally affixed to structural members using an adhesive, such as an epoxy. These adhesives are extremely suitable for use in affixing the patches covering the strain gauges to the structural members. Such patches are normally comprised of epoxy resins, silicone based adhesives, cyanoacrylate based adhesives and the like. Since the material overlying the strain gauges may be sufficiently flexible such that lowering of pressure within the patch could cause a collapse, it is advantageous to use a "bleeder" or porous meterial to allow fluid communication with all portions of the patch to the end of the fluid tight communication conduit connected to the monitoring device. Such materials can be paper, cloth, foamed plastics, and the like.

Although the most preferred embodiment has been described as very low pressure or vacuum, it is understood that pressure above ambient in the patch sites can be employed if care is taken not to exceed the pressure containable by the sealants and lines used in the apparatus.

Thus the instant invention describes an apparatus capable of predicting crack initiation in metallic structural member comprising (a) at least one strain gauge located in a structural area subject to cyclic stress, (b) connected to a monitoring device which allows the measurement of fatigue relaxation and fatigue intensification under measured strain range per unit load, and (c) predicting crack initiation when fatigue intensification falls below the initial strain range per unit load. In the more preferred apparatus a reference strain gauge is used on structural member outside the high stress area to reference the stress strain change in fatigue area. A most preferred embodiment is when both gauges are in fluid communication beneath a patch excluding ambient atmosphere.

While certain embodiments and details have been shown for the purpose of illustrating this invention, it will be apparent to those skilled in this art that various changes and modifications may be made herein without departing from the spirit or scope of the invention.

We claim:

1. A method for monitoring imminent fatigue crack failure of metallic structural members comprising sensing strain on said structural member and monitoring said strain for fatigue relaxation and subsequent fatigue intensification, said crack initiation being of high probability when fatique intensification as determined by the measured strain range per unit load returns to near or below beginning measured strain values.

2. A method as described in claim 1 wherein a strain sensor is placed on a high stress area and a control strain sensor is placed on a low-stress portion of the structure at a linear distance of at least a structural member thickness from the highly stressed sensor.

3. A method as described in claim 2 wherein a plurality of strain gauges are placed in stress areas.

4. A method as described in claim 3 wherein the crack initiation monitoring is made on a bridge structural member.

5. A method as described in claim 3 wherein the crack initiation monitoring is made on a ship structural member.

6. A method as described in claim 3 where the crack initiation monitoring is made on an offshore platform structural member.

7. A method as described in claim 3 wherein the strain gauges are placed within a patch excluding them from ambient environment and a fluid passageway is sealed in fluid communication from the patch to a source of pressure different than ambient at the structural member and strain gauge, said fluid passageway being connected to a pressure sensor and imparting a higher or lower pressure than ambient through the patch and the fluid passageway, while monitoring both the strain gauge and the internal pressure of the patch.

8. A method as described in claim 7 wherein the structural member is part of an offshore platform and wherein the strain gauge is attached to a weld joint connecting one member to another member on the offshore platform structure.

9. A method as described in claim 2 wherein the crack initiation monitoring is made on an airplane structural member.

* * * * *